Oct. 7, 1947.  R. F. HLAVATY  2,428,709
MATERIAL HANDLING
Filed Sept. 29, 1941  8 Sheets-Sheet 6

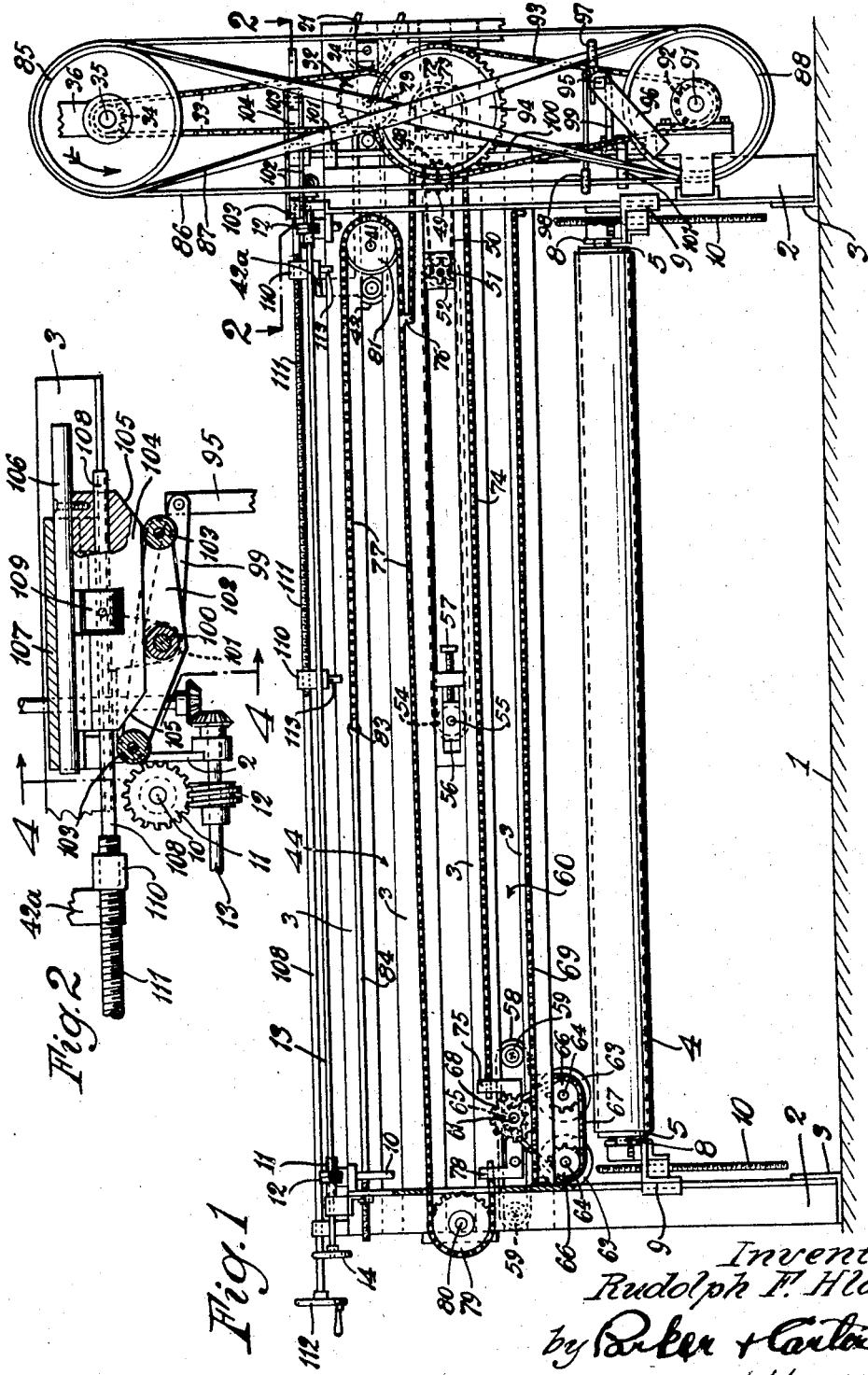

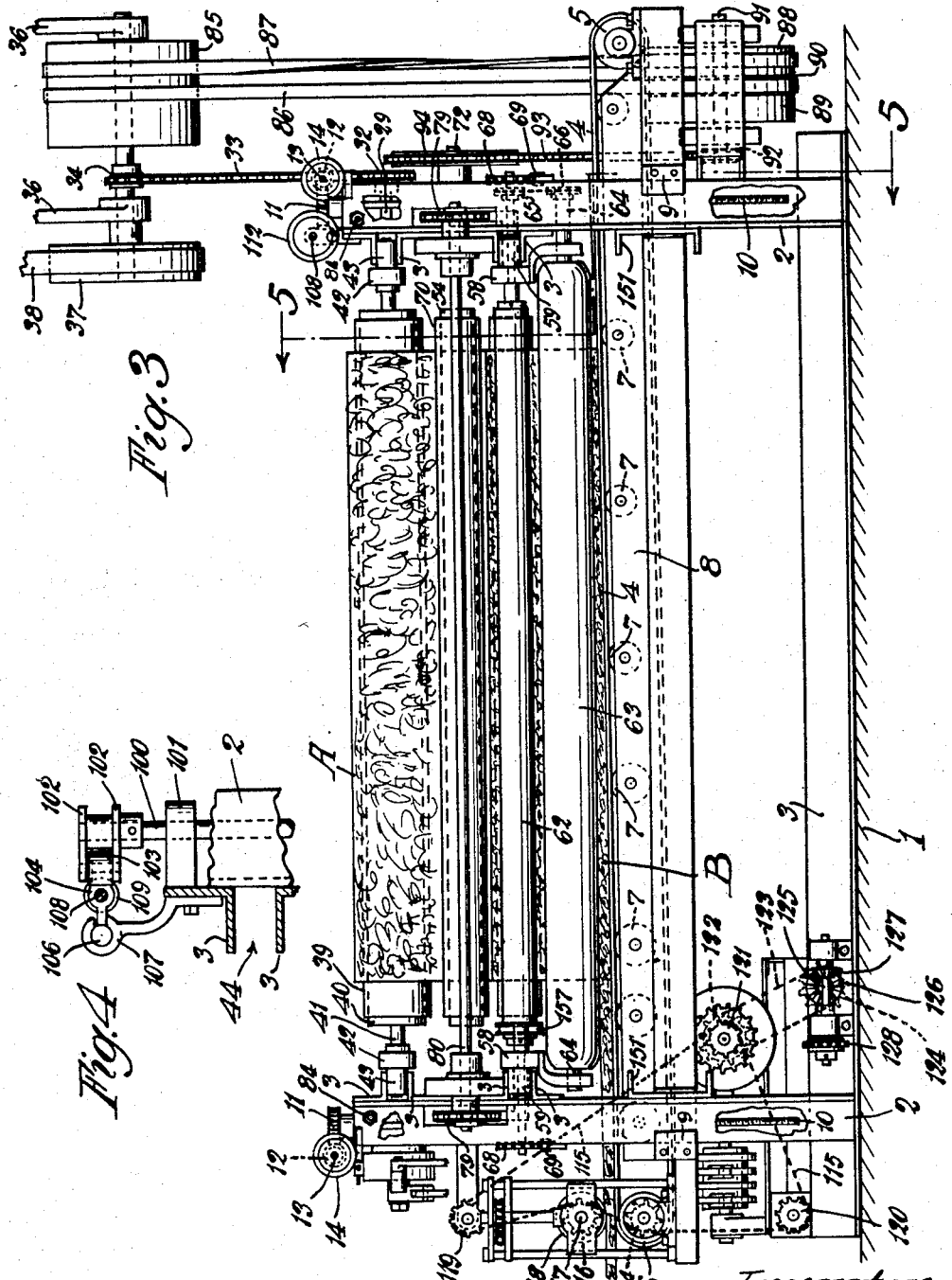

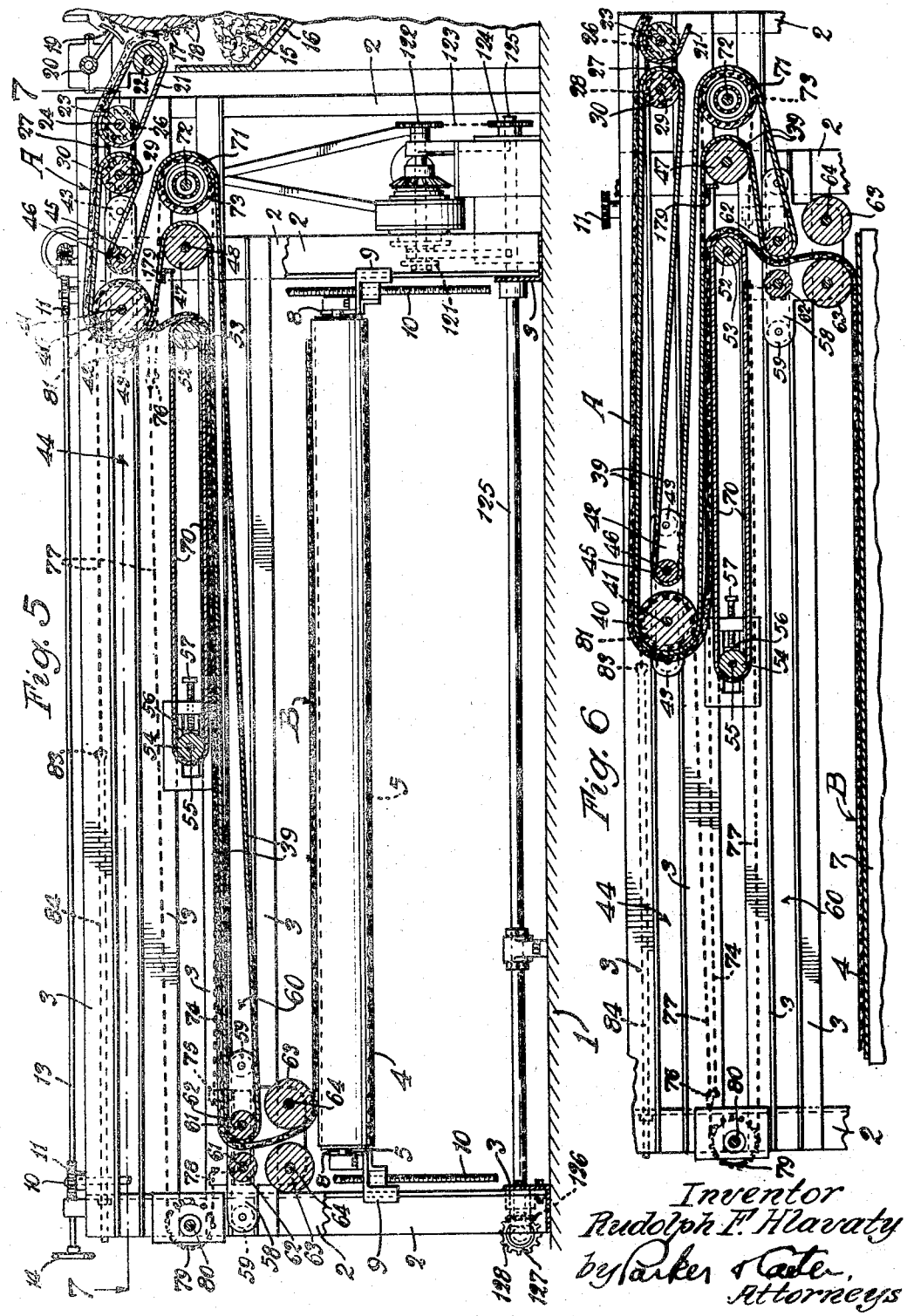

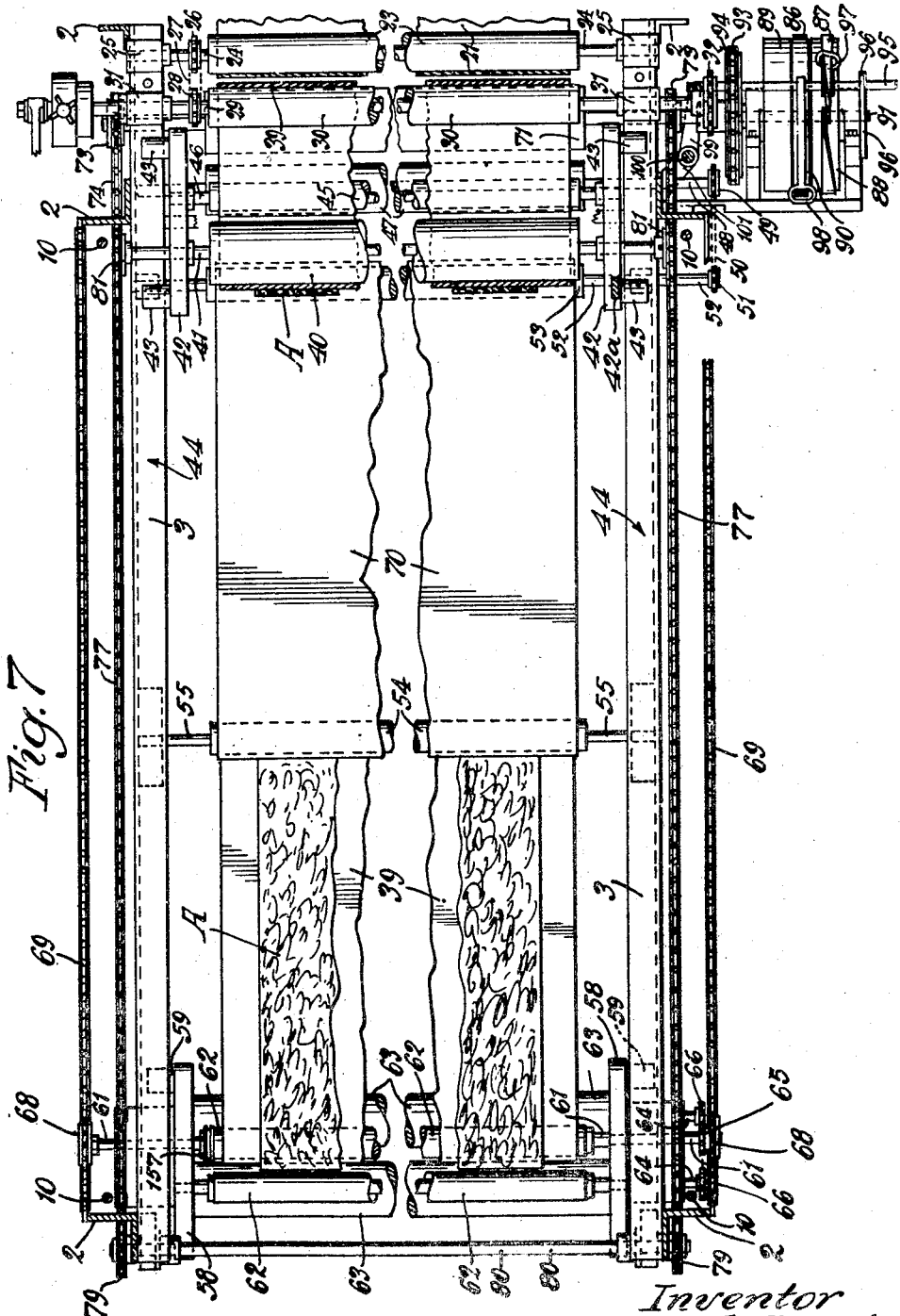

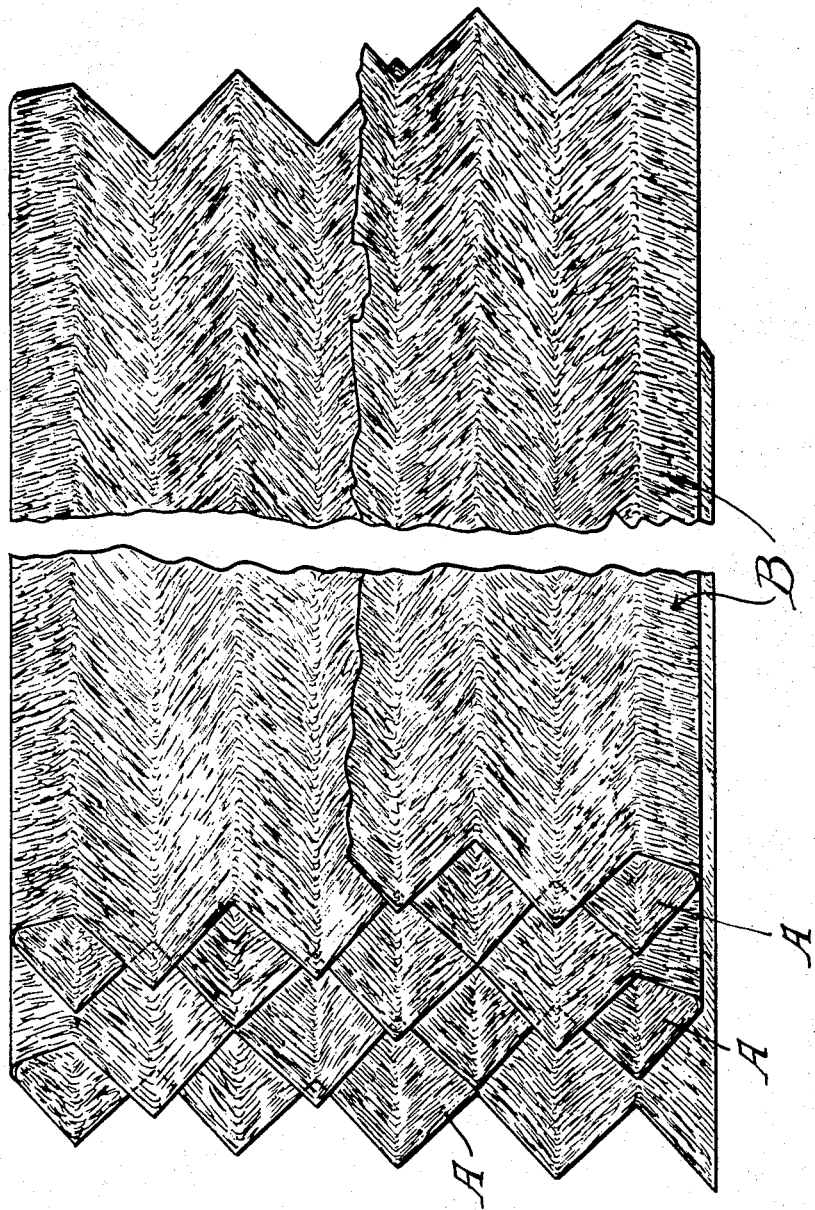

Inventor
Rudolph F. Hlavaty
by Parker & Carter.
Attorneys

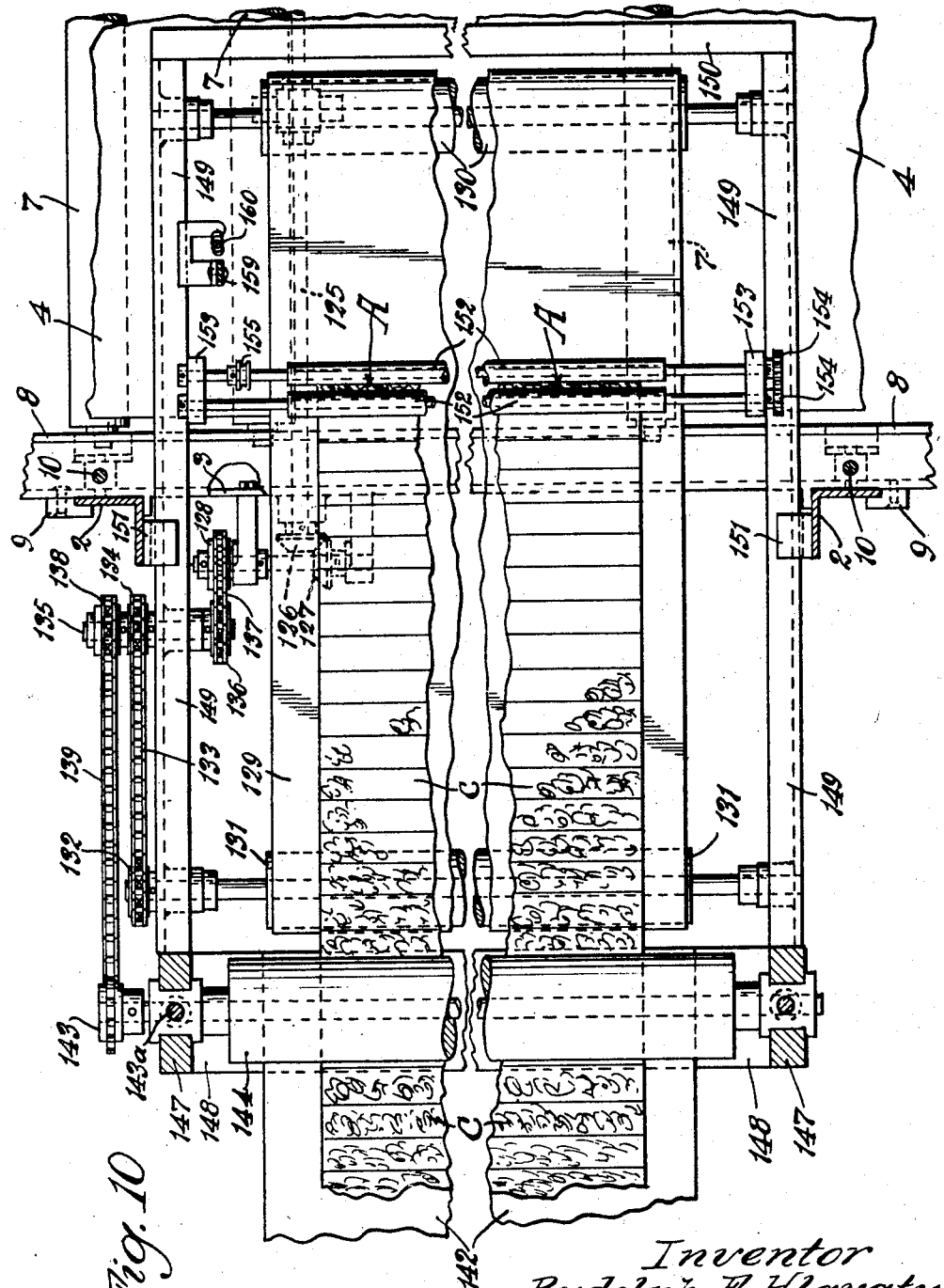

Oct. 7, 1947.   R. F. HLAVATY   2,428,709
MATERIAL HANDLING
Filed Sept. 29, 1941   8 Sheets-Sheet 8
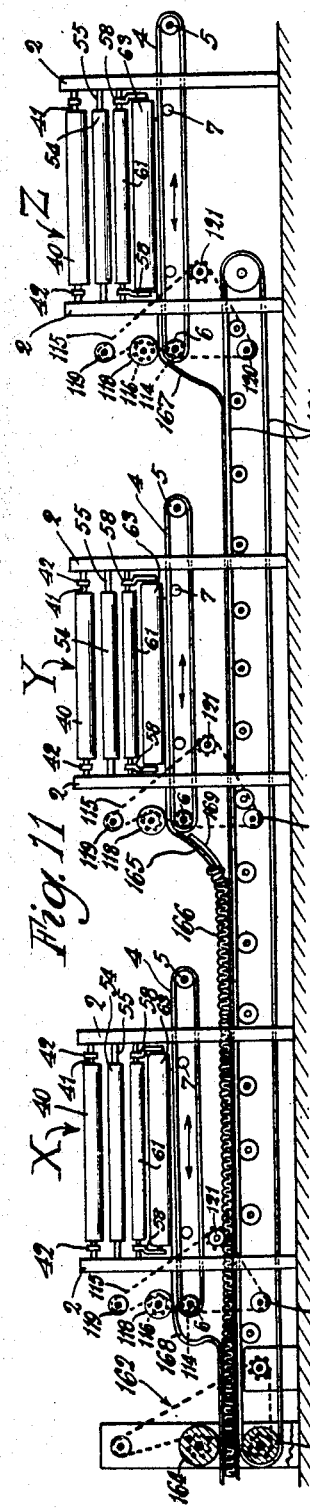
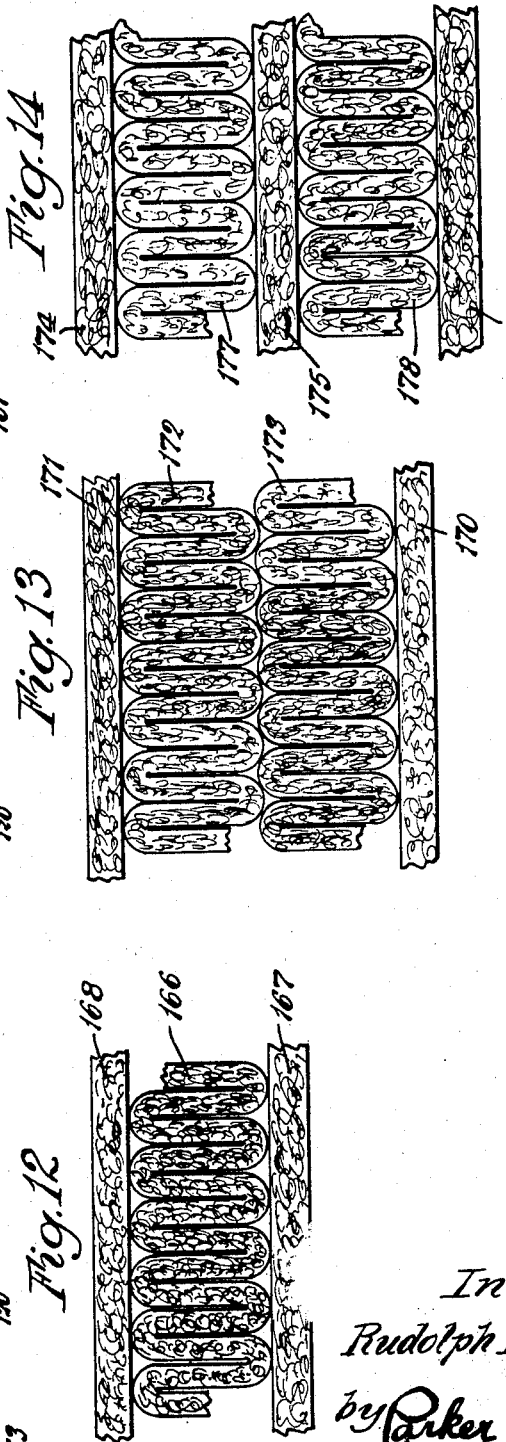
Inventor
Rudolph F. Hlavaty
by Parker & Carter,
Attorneys.

Patented Oct. 7, 1947

2,428,709

UNITED STATES PATENT OFFICE 2,428,709

MATERIAL HANDLING

Rudolph F. Hlavaty, Cicero, Ill.

Application September 29, 1941, Serial No. 412,815

14 Claims. (Cl. 19—163)

This invention relates to a machine and method for handling material to provide an article formed of several layers of material laid one upon the other. It may be used for forming a "batt," or it may be used for forming any arrangement of layers of any material.

Another object is to provide means for laying one layer of material upon the other, no matter what form of feeding mechanism is used. Thus material may be fed to the machine by a belt, as shown, or by blowing, pouring, directly applying, or in any manner at all.

Another object is to provide means for handling fibrous material to produce an article formed of layers. A further object is to provide a machine and a method for handling material of any sort and for laying this material in layers and for laying one layer of material upon another, and this method may be carried out with fibrous material, plastic material, cellulose material, and with materials such as metal and glass, which are ordinarily solid when cool but which may be handled in a molten or plastic state. For some purposes the machine or process may produce a batt or layer of fibrous material in which the fibers of one layer are at right angles to the fibers of the layer below.

Another object is to provide a machine and a method by means of which the web, batt, or film or layer as it is formed, is fed away from the forming machine in a back and forth movement, so that additional doubling or thickening of the materials is provided for.

A further object is to provide a machine and a method by means of which a plurality of separate batts or layers may be formed and super-imposed one upon the other and to correlate the batts or layers as they are formed, in such a manner as to cause folding of one layer of material while adjacent layers above or below are not folded.

Other objects will appear from time to time throughout the specification and claims.

This invention is illustrated more or less diagrammatically in the accompanying drawings, wherein:

Figure 1 is a side elevation of one form of the device.

Figure 2 is a detailed, horizontal section taken on an enlarged scale at line 2—2 of Figure 1.

Figure 3 is an end elevation of the machine shown in Figure 1, with parts broken away.

Figure 4 is a vertical sectional detail taken at line 4—4 of Figure 2.

Figure 5 is a longitudinal vertical sectional view taken at line 5—5 of Figure 3.

Figure 6 is a fragmentary view showing the mechanism of Figure 5 with the parts in a different postion.

Figure 7 is a horizontal sectional view taken at line 7—7 of Figure 5 and showing parts in section and parts in elevation.

Figure 8 is a plan view of one form of the batt produced by the machine shown.

Figure 10 is a horizontal sectional view taken at line 10—10 of Figure 9.

Figure 11 is an elevation of a modified form of the invention, in which several machines are associated together with a single carrier for the formation of a composite article.

Figure 12 is a longitudinal section illustrating one form of a composite article which can be made by three machines, as shown in Figure 11.

Figure 13 illustrates a further modification of the composite article.

Figure 14 illustrates a still further modification.

Like parts are indicated by like characters throughout the specification and the drawings.

Figure 9:
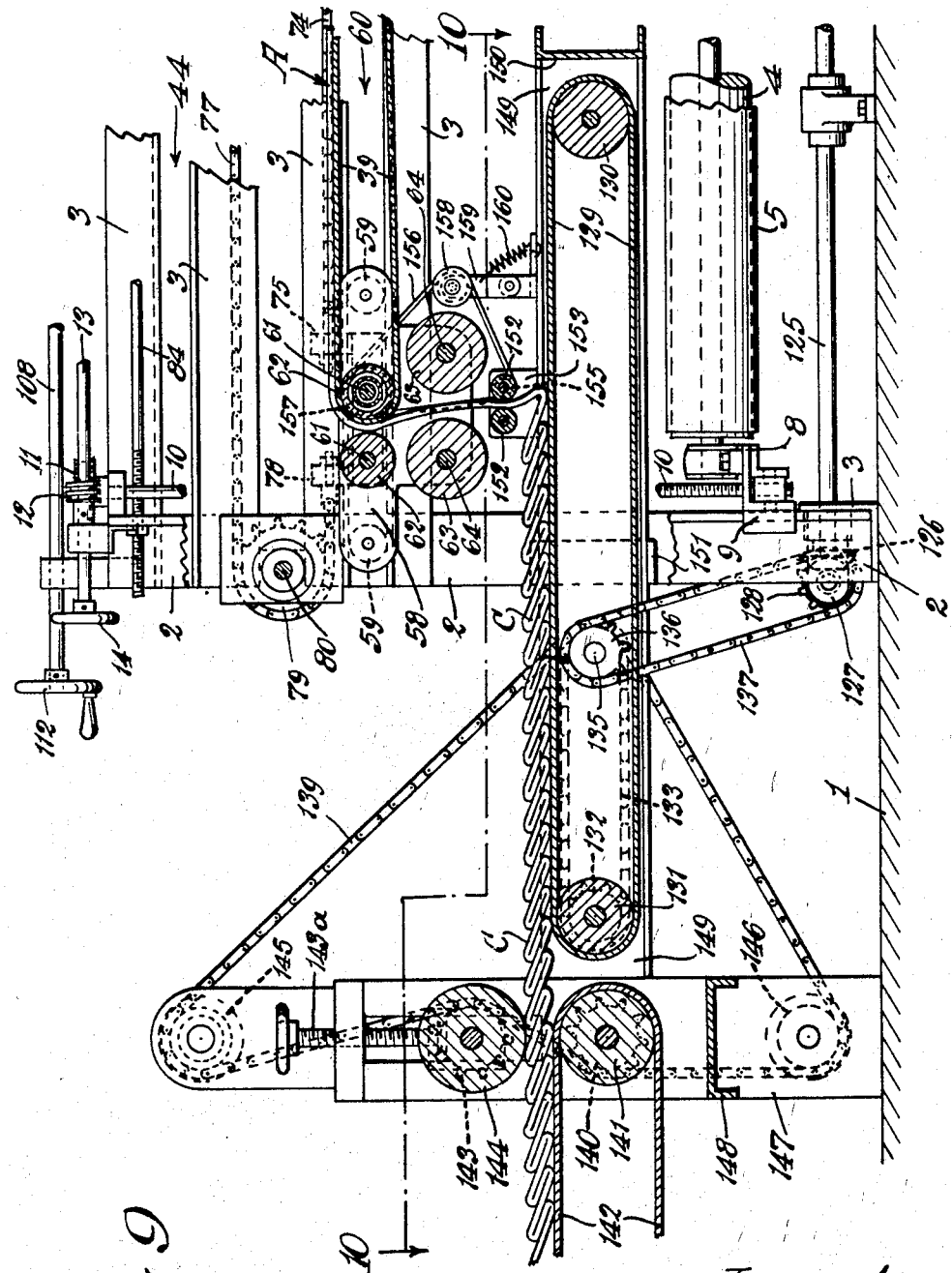
Figure 9 is a side view with parts taken in section and parts in elevation showing the left-hand end of the machine of Figure 1 in a modified position of adjustment, and associated with an additional conveyor.

As shown, the batt-making machine is supported on a foundation or floor 1 of any desired sort, and includes vertical frame members 2—2, and may also include longitudinal frame members 3—3. The invention is not limited to any particular details of frame mechanisms, and almost any frame which will adequately support the parts necessary for the operation of the machine may be used. While the material which is handled in the machine may be deposited upon any desired carrier, it is frequently desirable to deposit the material which is produced upon a carrier, such as shown in Figures 1, 5, and 6. As shown, this carrier includes a belt or conveyor 4 which runs about a roller or pulley 5 at one end and at the other end runs about a driven pulley 6. A plurality of idler rollers 7 may be mounted to contact the belt 4 and to support it when pressure is exerted against its upper surface or against the material on that surface, as will be described below. These pulleys as shown are supported in bearings in side members 8. These side members are supported in brackets 9, each of which may engage one of the vertical frame members 2. Each of the bracket members 9 engages a screw 10 and these screws extend upwardly, and it preferably carries on or near its upper end a worm gear 11 which meshes with a worm 12 on a control or adjusting shaft 13. There will ordinarily be two such shafts, one positioned on or near each side of the machine, and each of these shafts carries two worms 12. A hand adjusting wheel 14 is positioned on each of the shafts. By means of this wheel the shafts may be rotated and the conveyor structure, including the belt 4 and the pulleys 5 and 7 move up or down. As shown in Figures 1, 3, and 5, the conveyor assembly is in an upper position, and as shown in Figure 9 it is in a lower position.

The material to be treated is shown at 15 in a hopper 16. A drum or cylinder 17 provided with projections or teeth 18 is rotated by any desired means and carries material from the hopper upwardly, as indicated particularly in Figure 5. This material is carried upwardly in a web-like formation and is removed from the drum by a doffer 19. The web moves from the doffer 19, which is driven from a shaft 20, by any desired means, to an initial conveyor 21, which as shown includes a belt rotating about an idler pulley 22. At its opposite end the belt rotates about a driven pulley 23 which is carried on a shaft 24 rotating in bearings 25 carried by one of the longitudinal frame members 3. The shaft 24 carries a sprocket 26, which meshes with a chain 27 by means of which it is driven. The chain 27 meshes with a sprocket 28 on a shaft 29, which carries a pulley 30. This shaft rotates in fixed bearings 31, mounted on one of the longitudinal frame members 3. Upon its end opposite the sprocket 28 the shaft 29 carries a second sprocket 32, which is engaged by a chain 33, which meshes with a sprocket 34 on a power shaft 35, which is carried in suitable bearings in hangers 36. A pulley 37 mounted on the shaft 35 is driven by a belt 38 or otherwise. The invention is not limited to any particular means for driving the machine, and it may be driven by a directly connected motor or otherwise, and the particular means here shown for imparting movement to the machine is merely illustrative of one suitable means for driving the machine.

A flexible conveyor member 39 passes about the pulley 30 and passes thence about a pulley 40, which is carried on a shaft 41. This shaft is carried in suitable bearings at each end in a dolly 42, having an upward projection 42a. Each side member of the dolly includes rollers 43 which move in a channel groove or track 44 formed between two of the longitudinal side frame members 3. A second pulley 45 is carried on a shaft 46 which is also supported in the dolly members 42. The conveyor 39, however, passes from the pulley 30 to the pulley 40, and thence to a pulley 47 which is carried on a shaft 48. The shaft 48 is supported in suitable bearings on the side frame members and at one end carries a sprocket 49. A chain 50 engages the sprocket 49 and engages also a sprocket 51 on a shaft 52, which rotates in fixed bearings supported in the side frame members. A pulley 53 is positioned on the shaft 52. A pulley 54 is supported on a shaft 55, which is mounted in adjustable bearing members 56, supported in side frame members. Screws 57 provide for adjustment of the bearings 56.

The conveyor member 39 passes from the pulley 47 to a second dolly, which includes side members 58, 58, one locked on each side of the machine. These dolly members are provided with rollers 59, which are positioned in track spaces 60 formed by the pairs of adjacent side frame members 3. The members 58 support two shafts 61, which extend between them both and upon each shaft is mounted a pulley or roller 62.

"Ironing" rollers 63, 63 are mounted on shafts 64, which are carried in bearings supported by the dolly frame members 58. One of the shafts 61 carries a sprocket 65 and each of the shafts 64 carries a sprocket 66. A chain 67 engages the sprocket 65 and the two sprockets 66. One of the shafts 61, in the particular form here shown it is the right-hand shaft 61, carries at each end a sprocket 68, and each of these sprockets engages a rack 69. In the particular form here shown, the racks comprise chains, each of which may be laid upon a side frame member, or otherwise supported, and serves as a rack, although the rack might be otherwise made.

The sprockets 68 mesh with the rack chains 69 and rotate the rollers as the dolly 58 is moved back and forth. In addition to the conveyor member 39, a second conveyor member 70 is mounted for rotation about the pulleys or rollers 53 and 54.

The conveyor member 39 passes from the roller or pulley 61 to a roller or drum 71 which is mounted loosely on a shaft 72, so that the drum and the shaft may have relative movement and the drum itself is an idler. The shaft is carried in suitable bearings on the frame structure. At each end the shaft 72 carries a sprocket 73. Chains 74 are engaged one on each side of the machine, with the sprockets 73. One end of each chain 74 is secured to a dolly member 58, as at 75, and the other end of each chain 74 is secured as at 76 to a second chain 77. Each chain 77 is secured at one end as at 78 to a dolly member 58, and passes about a sprocket or pulley 79 which is mounted upon a shaft 80. At its other end, each chain 77 passes about a sprocket or pulley 81 on the shaft 41, and each chain 77 is fastened at its opposite end as at 83 to an adjustable member 84, these members being mounted in the vertical frame members 2.

As above mentioned, the mechanism is driven from the shaft 35 by means of belt 38 or otherwise.

The driving means for moving the two dollies back and forth and for reversing them include a pulley 85, upon which is mounted an open belt 86 and a crossed belt 87. These belts pass about an assembly including an idler pulley 88 and a second idler pulley 89, between which is mounted a driving pulley 90. These pulleys are mounted on a shaft 91, to which the driving pulley 90 is fixed and about which the idler pulleys 88 and 89 may rotate. Suitable bearings are provided for carrying the shaft, which may be supported from the general framework of the machine. Fixed also on the shaft 91 is a sprocket 92, about which a chain 93 passes. This chain engages a sprocket 94 fixed on the shaft 72. Fixed also on that shaft are the two sprockets 73, each of which engages one of the chains 74. When the open belt 86 is in the position shown in Figure 3, the dollies will be driven in one direction, and when it is shifted and the crossing belt 87 is moved on the driving pulley 90, the dollies will be moved in the opposite direction. The means for shifting the two belts to cause reversal of direction will now be described. Member 95 is a shift arm or rod which is slideably mounted on a member 96. The shift arm carries a loop member 97 which engages the crossed belt and a second loop member 98 which engages the open belt. These members are formed in arms or otherwise fastened to the shift rod. The shift rod 95 is connected to an arm 99 which is mounted on a vertical shaft 100, supported in suitable bearings carried by the members 101, which are themselves fastened to a frame member 2. Fixed to the shaft 100 preferably adjacent its upper end is a shift lever 102, which as shown particularly in Figure 4 may be formed of two members secured together and between these members adjacent the ends of each are mounted rollers 103. A cam member 104 provided with two cam faces 105, 105 is mounted on a rod 106. This rod is moveably mounted in a guide or support 107, which is fastened to one of the longitudinal frame members 3. The cam member 104 embraces one end of the operating rod 108, upon which the member 109 is fixed, and this member fits into a suitable opening or depression formed in the cam member 104, so that it may shift the cam member but rotate with respect to it. Adjustably mounted on the operating shaft 108 are two stops 110. Each of these is positioned upon a threaded portion 111, and these portions are oppositely threaded so that rotation of the shaft 108 by means of the hand wheel 112 will move both of the stops 110 toward or from each other. The members 110 are provided with guides 113, which contact or embrace one of the longitudinal frame members, so that rotation of the shaft 108 does not rotate the stops 110. The position of the cams and associated parts shown in Figure 2 conforms to the showing of the same parts in Figure 1, and the adjustment has taken place so that the belts have been shifted to drive the upper dolly to the left and the lower dolly to the right from the positions shown in Figure 1.

It has been stated above that the conveyor belt 4 may be moved by any desired driving means. The one shown in outline herewith, however, is preferred for many purposes and it provides a back and forth movement. The belt or conveyor member 4 moves generally to the left, as shown in Figure 3, but preferably does so in a back and forth movement, moving to the left and then reversing, and moving back a distance less than that which it has moved to the left, and continuing this reversing back and forth movement, so that it gradually moves to the left and carries away the batt which has been formed. This back and forth movement of the carrier conveyor member 4, together with the back and forth movement of the dollies, causes the forming of a satisfactory batt, and when these movements are properly coordinated with each other, it causes the angular arrangement of fibers shown in Figure 8.

The drive for the conveyor member 4 is not illustrated in detail. It might be accomplished by a number of different mechanisms. One suitable mechanism is shown in my Patent No. 2,301,543, issued November 10, 1942, and filed of even date herewith. Associated with the driven pulley 6 is a sprocket 114. A driven chain 115 engages the sprocket 114 and engages and drives also a sprocket 116 fixed on a shaft 117, which carries an ironing roller 118, positioned generally parallel to the roller or pulley 6. The chain 115 passes from the sprocket 116 to an idler sprocket 119, which may be adjustable to vary the tension of the belt. A second idler sprocket 120 is also engaged by the chain 115. The chain itself is driven from a sprocket 121. The idlers might, of course, be pulleys instead of sprockets. The sprocket 121 is driven as above described, and may be driven in a straight-away forward direction to cause the conveyor 4 to move only in one direction, or it may be driven in a backward and forward movement to cause the type of feed above described.

Driven also with the sprocket 121 may be another sprocket 122, which meshes with the chain 123, and this chain engages the sprocket 124 on a shaft 125. At its opposite end the shaft 125 carries a bevel gear 126 which meshes with a second bevel gear 127, which in turn drives a sprocket 128. Bearings of any desirable type may be used for carrying the various parts just described, and clutch mechanisms may be inserted for controlling the drive. They are not shown, as their details form no essential part of the invention. In the modified form of Figures 9 and 10, the conveyor assembly which includes the means for supporting and driving the belt 4 has been moved to a lower assembly of adjustment than that shown in the earlier figures, and an additional conveyor operating in a different direction has been inserted. The conveyor member 4 operates at right angles to the conveyor 39, while the added conveyor 129 of Figures 9 and 10 operates in the same direction as the main conveyor 39. It includes an idler drum or roller 130, a second roller 131 driven by a sprocket 132, through a chain 133, which is itself driven by a sprocket 134 mounted on a stub shaft 135, which as shown particularly in Figure 10 carries a sprocket 136. This sprocket, by means of a chain 137, is driven from the sprocket 128. The shaft 135 carries a second sprocket 138, which, by means of a chain 139 drives a sprocket 140, which is fastened to a drum or roller 141 of an additional conveyor, which includes a belt 142. The chain 139 also drives a sprocket 143 on an ironing roller 144. Members 145 and 146 are idler sprockets or pulleys about which the chain 139 may pass. The ironing roller 144 is provided with an adjustment 143a by means of which it may be adjusted toward and from the pulley 140. Any suitable supporting means may be provided for the conveyors which include the belts 129 and 142. As shown, a pair of uprights 147 is used and is associated with at least one transverse member 148 and longitudinal frame members 149, which are themselves joined by a transverse member 150. The members 149 are also supported by the channels 151, which are shown in Figure 3 in the machine frame proper. These channels or other supporting means may be included in the main frame of the main machine to receive and support the frame of the modified conveyor assembly, as shown in Figures 9 and 10. Obviously, other frame and supporting members may be used, and the invention is not limited to any particular frame construction in this respect.

Since the dollies will be stationary, when the auxiliary conveyors of Figures 9 and 10 are used and only the conveyors 129 and 142 will be in motion, additional guiding rollers are provided to control and guide the movement of the web of material. These include two rollers 152, which are carried in supports 153, supported from the side frame members 149. These rollers 152 carry gears 154 which are preferably in mesh with each other, and the shaft which carries one of the rollers 152 is provided with pulley 155, upon which a belt 156 is positioned. This belt passes about a pulley 157, on the right hand roller or drum 62, as shown in Figure 7. As shown in Figure 9, the right-hand drum 62 is free to rotate upon its shaft 61, and it is driven by movement of the main conveyor 39, and through this movement the belt 156 is rotated and the rollers 152 are rotated. An idler 158 is mounted on a pivoted arm 159 which is yieldably held by a spring 160 which takes up slack and also holds the belt out of contact with the adjacent ironing roller 63.

As shown in Figure 11, further modification appears, and three machines are associated with a conveyor to provide a composite batt. The batt shown in Figure 12 is formed by the three machines of Figure 11, and it will be noticed that it includes three webs. The batt shown in Figure 13 includes four webs, and would be made by four machines, while the batt of Figure 14 showing five webs would be made by five machines.

The showing of Figure 11 is broadly diagrammatic, and the parts need not be described in detail. It will be obvious that the machines are shown in end view, generally as shown in Figure 3, and that parts of the drive and other details are omitted. For purposes of simplicity the machines are referred to as "X," "Y," and "Z," and each has a conveyor arranged with a drive similar to the drive shown in more detail in connection with Figure 3, and each has a conveyor which may move as indicated by the double-pointed arrows of Figure 11. This is the same as the conveyors 4 shown and described in greater detail in the earlier figures. Associated with the machine is a single conveyor 161, which is provided with a drive 162, which may be driven at variable speed and includes a pulley 163 for moving the conveyor 161, and may also include an ironing roller 164. The drive for the conveyor 161 is such that it may be moved in straightaway movement to the left or may have a back and forth movement.

To form the bat of Figure 12, the machine Y is arranged to operate more rapidly than the machines X and Z, and thus the web 165, which is discharged from the machine Y is formed into folds as indicated at 166, while the web 167, which comes from the machine Z, lies flat beneath the folded web 166, and the web 168, which comes from the machine X lies flat above the folded web 166. A guide 169 may be provided in association with the machine Y to guide the movement of the web 165 and to control the formation of the folds 166.

The batt of Figure 13 is formed, of course, by having four machines, of which the two central machines are operated more rapidly than the two end machines, so that the final batt includes a flat bottom layer 170, a flat upper layer 171, and two intermediate folded layers 172 and 173, and the batt of Figure 14 coming from five machines includes a flat upper layer 174, an intermediate flat layer 175, and a bottom flat layer 176. Between the layers 174 and 175 is a folded layer 177, and between the layers 175 and 176 is a folded layer 178. The arrangements shown in Figures 12, 13, and 14 are illustrative of the fact that a great many different sorts of batts may be produced by a suitable combination of machines and by suitably regulating those machines. It is obvious that by controlling the relative speed of the machines which are assembled together and that by controlling the speed and the direction of movement of the apron 4 and that by also controlling the speed and direction of movement of the conveyor 161, a tremendous variety of variations of products may be produced and the three shown are merely indicative of that fact. It is also obvious that within each machine X, Y or Z, the speed of movement of the reciprocating dollies may be varied and the speed of movement of the conveyor within the machine may be varied, and the speed and direction of movement of the conveyor 4 may be varied, and the speed with which the material is fed to the machine may be varied. All of these variable factors, together with those above described, permit a wide variety of possible adjustments and a wide variety of products. Folded intermediate layers may be loosely folded or tightly folded. When tightly and closely folded so that the folded portions stand vertically or substantially so, the fibers stand vertically, which increases the resiliency of the resultant product. Ordinarily the tightest fold will be produced where the conveyor of the machine which is producing the folded layer moves straight-away rather than back and forth, so that the web coming from that machine bends up more rapidly than the webs coming from the other machines, and so must be folded more tightly.

The material 15 as it is removed from the cylinder 17 by the doffer 19 comes out in the form of a more or less chain-like member A. This member has been referred to as the "web," and this word is intended to indicate the web or sheet-like arrangement of the material as it moves through the machine to be deposited on the conveying apron 4.

Successive layers of the web A are deposited on the apron and form a member composed of a number of super-imposed layers. This has been referred to as the "batt" and is designated in Figures 3 and 8 by the letter "B."

In the form of the invention shown in Figures 9 and 10, the web A as it is deposited on the conveyor 129 is in a different form. It is formed into a plurality of folds C and while this material may be considered and referred to as a batt, it is obviously of a different form of the batt "B" shown in particular in Figure 3, which batt is formed of a plurality of flat layers super-imposed one upon the other, while the batt C of Figures 9 and 10 is formed of a plurality of folds which to some degree overlie each other, but which are not fully super-imposed upon each other.

A scraper 179 may be associated with the conveyor belt or apron 39 and arranged as a safeguard to prevent material from adhering to the apron or from being carried around by it beyond the conveyor 70.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing. In particular, although the machine and method have been generally shown, and described, as applied to a batt formed of fibrous material, the invention is in no sense limited to these materials, and the machine may handle and the method is applicable to any material which is of such nature that it can be handled by the conveying means shown, and although a simple cylinder, doffer, and feeding belt are shown as a means for conveying the material to the lapping conveyor, any feeding or supplying means may be used, and it is sufficient for the purposes of the invention that the material which is to be treated shall be deposited upon the lapping conveyor. The invention is, therefore, not limited to any particular means for depositing material upon the lapper or for conveying it to the apparatus. Among the materials which can be readily handled with the normal apparatus as shown are fibers, cellulose, and mixtures of fibers and cellulose, many forms of plastics arranged in layers or in fibrous form, or in the mass, and plastic material where handled may be mixed with fibrous or other material. It is within the contemplation of my invention to handle hot material and acids or materials including acids, and where either of these is used, the aprons or conveyors must be of such material as to resist the heat or resist the acid.

In the forms of the invention shown in Figures 11–14, inclusive, as shown in the drawings the materials of the several layers, for example 166, 167, and 168 in Figure 12, or 170, 171, 172, and 173 in Figure 13, or 174, 175, 176, 177, and 168 in Figure 14, appear as though all were made of the same material, and they may in fact be so made. On the other hand they may be made of different material, and if desired adhesive may be used to fasten the materials together, and if that were done, means would conveniently be provided in the mechanism for applying the adhesive or possibly some other treatment to the layers of material as they are formed or as they are deposited together. The flat layers in the forms of Figures 11–14 might, for example, be of paper or cardboard or fiber board, and the folded layers might be of material such as cotton, jute, kapok, or any natural or artificial fiber. These figures are therefore to be understood as indicating merely the fact that the products of several machines may be associated together in the final article, and that they may be of different sorts of materials, and the treatment such as cementing or other treatments may be applied to the layers as they are formed or as they are assembled together in the final article.

The use and operation of the invention are as follows:

The operation of the form of the device shown in the first seven figures is as follows: Material is put into the hopper 15 by any means and is removed therefrom by the cylinder 17. It passes out as a web A over the initial conveyor 21, and is deposited on the upper right-hand portion of the conveyor 39. It moves thence along with the conveyor and about the pulley or drum 40 to the conveyor 70. It passes downwardly about the right-hand end of that conveyor, as shown particularly in Figures 5 and 6, and moves between it and a lower portion of the conveyor apron 39, until it reaches the right-hand roller 62. It moves downwardly from that roller between it and the adjacent roller 62, and thence between the ironing rollers 63 to be deposited upon the conveyor apron 4.

When the apparatus is so arranged that the dollies 42 and 58 move back and forth, they move from the position of Figure 5 to the position of Figure 6, and in their movement between these limits the conveyor pulley or drum 40 moves one-half the distance moved by the drum or pulley 61. As the pulley 40, carried by the dolly 42, moves to the left from the position shown in Figure 5 to the position shown in Figure 6, a portion of the web "A" is deposited on the conveyor 70. Thus, as the dolly 42 moves to the left from the position of Figure 5, the dolly 58 is simultaneously moving to the right, and it moves approximately twice as fast as does the dolly 42. Thus the dolly 42, in its movement to the left takes up the slack which is produced in the conveyor apron 39 by movement of the dolly 58 to the right, and during the time that the dolly 42 moves to the left, there is relatively little rotation of the drum 47—in fact, there may be no rotation of this drum for an interval. Since the drum 53 is driven from the drum 48, when the latter stands still, the conveyor 70 does not move, and thus the web is deposited on the substantially stationary conveyor 70 by the movement of the dolly 42 to the left.

When the dolly 42 has moved approximately to the position of Figure 6, the projection 42a from the dolly contacts the left-hand members 110, 113, and pulls the shift rod 108 slightly to the left, thus moving the cam 104 and contacting the left-hand roller 103, and thus shifting the lever 99 and the control rod 95 to shift the belts 86 and 87 for a reversal of the drive. When this reversal has been accomplished, the dollies move from the positions of Figure 6 back again toward the positions of Figure 5, and during that movement the roller or drum 47 is operated by friction from the conveyor apron 39, and thus it drives the drum 53 and the conveyor 70 so that the portion of the web which had been previously deposited on the conveyor 70 while the latter was stationary is discharged downwardly from the conveyor 70 over the drum 53. As this occurs, additional quantities of the web are fed along the upper portion of the apron 39 to the top of the conveyor 70, so that the web is not broken and continues in a continuous stream, and the speed of movement of the conveyor 70 is more rapid than the speed of movement of the apron 39, because the drum 47, which is rotated by the apron 39, is of larger diameter than the roller or drum 53, which drives the conveyor 70, and thus a sufficient feed of web from the conveyor 70 occurs, whichever direction the dollies may be moving.

In general, the dolly 58 moves twice as far and twice as fast as does the dolly 42, and the conveyor 70 serves as a means for accumulating and re-discharging sufficient web so that no matter what the relative positions and speeds of the two dollies may be, the web is supplied to the lower dolly in uniform quantities and at uniform speeds. In a sense, therefore, the conveyor 70 acts as a storage or accumulating means to accumulate web during the time when the dolly 42 is moving toward the dolly 58 to re-discharge it at accelerated speed when the dolly 42 is moving away from the dolly 58.

At each end of its excursion, the dolly 42 by means of its extension 42a contacts one or another of the members 110, 113 and effects a reversal in direction of the drive, which gives movement to the dollies. The drive of the conveyor belt or apron is continuous—i. e., the drive on the shaft 29 and the roller or drum 30 is continuous and is not interrupted as a result of movements of the dolly, although as above explained, parts of the apron 39 may be standing still or substantially still as a result of the dolly movement, which involves the letting out or the taking up of slack in the apron, and therefore may bring certain parts of the apron substantially to rest at certain times in the cycle of operation.

The back and forward movement which may be given to the conveyor apron 4 when properly timed with relation to the movement of the dollies 42 and 58 produces the fiber arrangement of Figure 8, and the fibers of each part of each layer are laid down substantially at right angles to the fibers of the corresponding part of adjacent layers above and below them. A different adjustment of the movements of the dollies and of the conveyor 4 would produce a different angular arrangement, but ordinarily the fibers of successive layers are laid down at an angle to those of adjacent layers whether or not that is a right angle.

In the form of the invention illustrated in Figures 9 and 10 the dollies 41 and 58 are not reciprocated, and the web A is discharged at a fixed point, i. e., from between the rollers 152. If the conveyor member or apron 129 were to move to the left in a straight-away movement, this web would be laid out flat. Since, however, the apron 129 is preferably given a back and forth feeding movement, the web is laid in the folds C and thus a folded batt is formed. It is to be remembered that the conveyor 129 is put in, so to speak, at the end of the machine, while the conveyor 4, when it is used, is to be considered as discharging from the side of the machine. Whatever the parts of the machine may be called, the conveyor 129 moves in the same direction as the conveyor 39, while the conveyor 4 is positioned at an angle to the direction of movement of the conveyor 39.

The combination of machines shown in Figure 11 produces, by proper adjustment, a composite batt which includes flat web members and folded web members. The folds of the folded members are shown as extending substantially vertical and that is an arrangement which can be accomplished, but the folds might be inclined, as they are shown to be in Figure 9, and the invention is not limited either to vertical folds or to inclined folds. The direction, size, and tightness of the folds may be controlled by controlling the relative adjustment of the speed of the various conveyors or carriers upon which the webs are formed and from which they are discharged, and controlling the speed of the final carrier 161, upon which the composite batt is built up by discharge from the various machines which form the total assembly.

I claim:

1. In combination in a lapper assembly, means for forming a composite fibrous article of a plurality of webs of fibrous material, and for simultaneously folding one of said webs, said means including a plurality of lappers, each arranged to form a web of fibrous material, and a main conveyor, each of said lappers adapted to deposit its web upon said main conveyor, and means for driving one of said lappers faster than another, whereby one web is deposited on the main conveyor more rapidly than another web, and is thereby folded as discharged, each of said lappers being provided with means for making a web of a plurality of fibrous layers, and for arranging the fibers of each layer in a plurality of zones, those of each zone being disposed at an angle to those of the adjacent zones.

2. In combination in a lapper assembly, means for forming a web of a plurality of thicknesses of fibrous material, a conveyor for receiving said web, means for depositing the web thereon, means for driving said conveyor to carry away the web, said conveyor having a back-and-forth movement in the main conveying direction, in addition to said driving movement, whereby successive layers of material which are deposited on the conveyor are arranged with the fibers of a layer disposed in a plurality of zones and at an angle to the fibers of corresponding zones in the layers above and below it, there being a plurality of lappers in said assembly, and a main conveyor positioned to receive web from each of said lappers, and means for depositing different amounts of web from different lappers comprising means for driving said lappers at speeds different from each other, and means for driving said main conveyor.

3. In combination in a lapper assembly, means for forming a web of a plurality of thicknesses of fibrous material, a conveyor for receiving said web, means for depositing the web thereon, means for driving said conveyor to carry away the web, said conveyor having a back-and-forth movement in the main conveying direction, in addition to said driving movement, whereby successive layers of material which are deposited on the conveyor are arranged with the fibers of a layer disposed in a plurality of zones and at an angle to the fibers of corresponding zones in the layers above and below it, there being a plurality of lappers in said assembly, and a main conveyor positioned to receive web from each of said lappers, and means for driving said lappers at speeds different from each other to deposit different amounts of web from different lappers, and means for driving said main conveyor.

4. In combination in a lapper, means for forming a web of fibrous material and for conveying it to a point of discharge, and means for positioning successive layers of web one upon the other, a conveyor for receiving said layers said conveyor having a back-and-forth movement in the main conveying direction whereby a layer is deposited with its fibers aligned in a plurality of zones and the fibers of each zone are positioned angularly with respect to the fibers of the corresponding zones of adjacent layers.

5. In combination in a lapper assembly, means for forming a web of fibrous material and for conveying it to a point of discharge, and means for positioning successive layers of web one upon the other, a conveyor for receiving said layers and means for driving said conveyor whereby a layer is formed into a plurality of angularly disposed zones as it is deposited and with the fibers of each zone positioned angularly with respect to the fibers of corresponding zones of adjacent layers, a plurality of said web-forming means being associated together, and a main conveyor positioned to receive a web from each of said web-forming means, whereby a plurality of webs is deposited one upon the other.

6. In combination in an assembly of lappers, each lapper including web-forming means, said web-forming means of each lapper including a conveyor positioned to operate about fixed centers, and a second conveyor, said second conveyor being looped, there being means for moving portions of said second conveyor back and forth with respect to said first conveyor, and a third conveyor positioned to receive material from said second conveyor, and means for driving said third conveyor, said third conveyor having a back-and-forth movement in the main conveying direction, additional to its main driving movement, and a general conveyor positioned to receive material from each of said lappers, and means for moving said general conveyor.

7. In combination in an assembly of lappers, each lapper including web-forming means, said web-forming means of each lapper including a conveyor positioned to operate about fixed centers, and a second conveyor, said second conveyor being looped, there being means for moving portions of said second conveyor back and forth with respect to said first conveyor, and a third conveyor positioned to receive material from said second conveyor, and means for driving said third conveyor, said third conveyor having a back-and-forth movement in the main conveying direction, additional to its main driving movement, and a general conveyor positioned to receive material from each of said lappers.

8. In a lapper, a web-forming means comprising a conveyor, positioned to move about fixed centers, and a second conveyor positioned to deposit web upon said first conveyor and to receive it therefrom, said second conveyor being looped, there being means associated with the ends of said second conveyor, and means for moving said ends bodily back and forth, and a third conveyor positioned to operate at an angle to the path of said second conveyor, one end of said second conveyor being adapted as it moves back and forth to deposit a web upon said third conveyor, and means for driving said third conveyor to carry away material deposited upon it from said second conveyor, said third conveyor having a back-and-forth movement in the main conveying direction, in addition to its main driving movement.

9. In a lapper, a web-forming means comprising a conveyor positioned to move about fixed centers, and a second conveyor, and means for moving the portions of said conveyor back and forth, means for depositing material upon said second conveyor, and a third conveyor, positioned to operate at an angle to the path of said second conveyor, said second conveyor being adapted, as portions of it move back and forth, to deposit material upon said third conveyor, and means for moving said third conveyor to carry away material deposited upon it, said third conveyor having a back-and-forth movement in the main conveying direction, additional to its main driving means.

10. In combination in a lapper, a fixed conveyor, a moveable conveyor, and means for driving the moveable conveyor, and additional means for moving the ends of the moveable conveyor back and forth and for moving one through a path substantially twice as long as the path through which the other moves, the stationary conveyor being driven from a member which is itself driven by the moveable conveyor, the movement of the ends of the moveable conveyor being such that at times the stationary conveyor is not driven, and a third conveyor positioned at right angles to the two first-mentioned conveyors, and means for moving said third conveyor, said third conveyor having a back-and-forth movement in the main conveying direction.

11. In a lapper, a web-forming means comprising a conveyor positioned to move about fixed centers, and a second conveyor, and means for driving said second conveyor, a member driven by said second conveyor, and connected to said first conveyor to drive the same, and a third conveyor positioned angularly with respect to said second conveyor, and adapted to receive a web from said second conveyor, and means for driving said third conveyor, said third conveyor having a back-and-forward movement in the main conveying direction as it is driven, and means for moving the ends of said second conveyor back and forth with respect to said first conveyor and said third conveyor.

12. The method of forming a batt of fibrous material which includes the following steps: depositing a continuous web of fibrous material, moving said web as it is deposited in a direction transverse to the direction of deposit and giving to said web a back and forth movement in the direction of its main movement whereby the fibers of the web are deposited in separate zones, and depositing the fibers of each zone at an angle to the fibers of the adjacent zones.

13. In combination in a lapper, traversing means driven to move transversely of said lapper for depositing web, a longitudinal conveyor positioned to receive web material from said traversing means in a plurality of superimposed layers, and means for driving said longitudinal conveyor, said conveyor having a back and forth movement in the direction of its main conveying movement, whereby a layer of web is deposited upon it from said traversing means in a plurality of zones, with the fibers of said layer aligned in each zone, the fibers of each zone being positioned angularly with respect to the fibers of corresponding zones of adjacent layers.

14. In combination in a lapper, traversing means driven to move transversely of said lapper for depositing web, a longitudinal conveyor positioned to receive web material from said traversing means in a plurality of superimposed layers, and means for driving said longitudinal conveyor, said conveyor having a back and forth movement in the directions of its main conveying movement, whereby a layer of web is deposited upon it progressively as said main conveyor moves, from said traversing means in a plurality of zones with the fibers of said layer aligned in each zone, the fibers of each zone being positioned angularly with respect to the fibers of corresponding zones of adjacent layers.

RUDOLPH F. HLAVATY.

REFERENCES CITED

The following references are of record in the file of this patent:

UNITED STATES PATENTS

| Number | Name | Date |
| --- | --- | --- |
| 788,555 | Pitts | May 2, 1905 |
| 938,437 | Scribner | Oct. 26, 1909 |
| 970,971 | Thompson | Sept. 20, 1910 |
| 1,876,194 | Wuest | Sept. 6, 1932 |
| 1,886,919 | Sturgis | Nov. 8, 1932 |
| 1,958,819 | Grayson | May 15, 1934 |

FOREIGN PATENTS

| Number | Country | Date |
| --- | --- | --- |
| 12,227 | Great Britain | 1891 |
| 67,292 | Sweden | Apr. 30, 1929 |